No. 666,531. Patented Jan. 22, 1901.
E. R. KRAUSE & M. O. ZILL
COUPLING.
(Application filed Sept. 25, 1900.)

(No Model.)

Witnesses:
Carl Pönsgen.
Wm M Miller

Inventors:
Ernst Richard Krause
Max Otto Zill
By Hauff & Hauff
Their Attorneys.

UNITED STATES PATENT OFFICE.

ERNST RICHARD KRAUSE AND MAX OTTO ZILL, OF LEIPSIC, GERMANY, ASSIGNORS TO KARL KRAUSE, OF SAME PLACE.

COUPLING.

SPECIFICATION forming part of Letters Patent No. 666,531, dated January 22, 1901.

Application filed September 25, 1900. Serial No. 31,098. (No model.)

*To all whom it may concern:*

Be it known that we, ERNST RICHARD KRAUSE and MAX OTTO ZILL, subjects of the King of Saxony, residing at Leipsic, in the Kingdom of Saxony, German Empire, have invented new and useful Improvements in Couplings, of which the following is a specification.

Friction - couplings, including those in which the frictional resistance is produced by a friction-ring, require comparatively considerable force in manipulation. This objection is especially noticeable when the coupling is used at machines tended by women or girls—as, for example, bookbinding-machines. By means of this invention this objection can be avoided by arranging a lever for spreading the friction-ring of the coupling, said lever being actuated by a cam or disk provided with a projection and connected with a shifting coupling part.

This invention is set forth in the following specification and claims and illustrated in the annexed drawings, in which—

Figure 1:
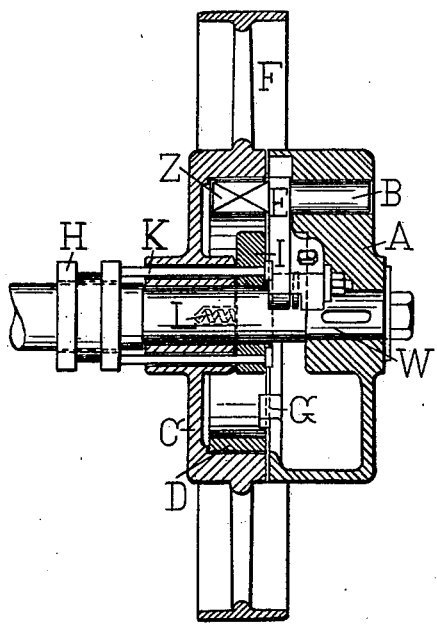
Figure 2:
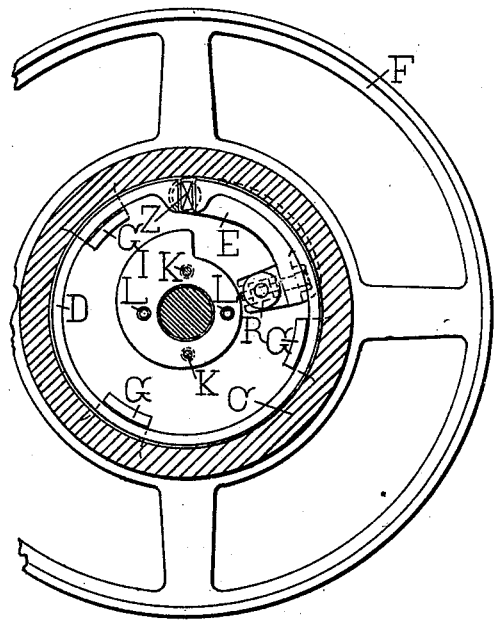
Figure 3:
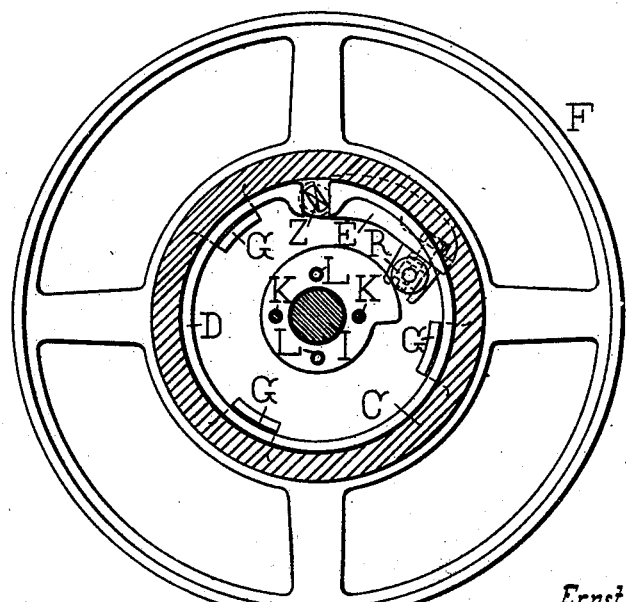

Figure 1 is a sectional side elevation of the coupling applied to a loose disk. Fig. 2 is a face view of the coupling released. Fig. 3 shows the coupling in action.

The hub or body part A of the clutch is shown secured or keyed to shaft W, so as to turn therewith. The body A supports the coupling-lever E, having its fulcrum B rotatably carried by said body. At its free end the lever is shown with a roller R. The fulcrum is extended in form of an angular or non-circular lug Z.

The friction or coupling ring D is fitted or placed into the hub or housing C of the loose disk F, and the lug Z engages or extends into or between the split or free ends of this ring. This clutch-ring D turns with the shaft W, being carried about by lug Z, and when idle the ring is carried by the flange or carrier pieces G, so as not to needlessly grind or rub against the wall of housing C. The pieces G are carried by the body A, and three such pieces are shown, although the invention is not confined to this number.

The shifting coupling part is connected with the loose disk or pulley F and with the shifter or sliding sleeve H. It consists of a disk or cam I, with one or more projections. This disk or eccentric is shiftably mounted on shaft W in housing C and connected with the shifter H by coupling-rods K, extended through the hub of the housing C. When the coupling is idle or open, the eccentric or cam is in the position shown in Fig. 1. When the shifter H is moved toward the coupling-body A to bring the cam I within reach of lever E, the friction-roller R of the latter rides on the circumference of the cam or disk and is lifted or actuated by the projection of the latter. By this play of the coupling-lever the lug Z spreads the coupling or clutch ring D and presses the latter against the inner wall of housing C, so as to rotate or carry along the loose disk or pulley F.

The cam or disk I can only move into action when the high part is away from the lever end. To avoid waiting for this moment of time, springs L can be applied inside the hub of the housing C and pressing against the cam cause the latter to move into action as soon as this cam can pass under the friction-roller R of the coupling-lever E. The same result can be attained by having the shift-lever moved toward the coupling-body A by a spring or weight. The action of the coupling shown can also be as follows: While the loose disk or wheel F is uncoupled, Figs. 1 and 2, it rotates on shaft W, the shifter H and cam I partaking of this rotation. The shaft W, however, together with coupling-body A, coupling-lever E, and friction-ring D, are at rest. If now the shifter-lever is released to free sleeve or slide H, the springs L come into action and shift the movable coupling parts toward body A. Since, however, cam I is rotating, it lifts or moves the lever, while its roller R rides on the projection of the disk or cam I. By its throw the lug Z spreads the clutch-ring D and presses it against the wall or circumference of housing C. When the friction has increased so that the body A and shaft W can be carried along, the machine is coupled. If the support is withdrawn from lever E by cam I being moved out of action, Fig. 1, the lever on the reaction or contraction of the split ring returns to its initial position and the machine is uncoupled.

The lever E swings toward and from shaft

W, and the cam I when moved along the shaft one way or another to or from the face of the lever will engage or release such lever, as required.

An advantage of this coupling is that the power for moving the coupling into engagement is obtained from the driving-shaft. The thumb-disk is moved by hand within reach of the expansion-lever. This movement requires uniform force irrespective of the greater or less power of the machine. A clutch of any desired size can thus be manipulated by any attendant.

What we claim as new, and desire to secure by Letters Patent, is—

1. A shaft provided with a lever, a pulley or wheel having a clutch-ring spread by the lever, a cam movable toward and from the lever, a shifting sleeve and rods connecting said sleeve to said cam, said lever being made to ride on or be actuated by the cam when the latter is moved into action substantially as described.

2. A coupling comprising a friction-ring, carriers for supporting said ring, a coupling-lever for operating said ring, a roller carried thereby, a cam engaging said roller for operating said lever, a sleeve, and a series of rods for connecting said sleeve to said cam.

In testimony whereof we have hereunto set our hands in the presence of two subscribing witnesses.

ERNST RICHARD KRAUSE.
MAX OTTO ZILL.

Witnesses:
RUDOLPH FRICKE,
CHAS. J. BURT.